United States Patent [19]

Fioravanti et al.

[11] Patent Number: 4,954,076
[45] Date of Patent: Sep. 4, 1990

[54] FLAME STABILIZED OXY-FUEL RECIRCULATING BURNER

[75] Inventors: Kenneth J. Fioravanti, Allentown, Pa.; Larry S. Zelson, Menlo Park, Calif.; Charles E. Baukal, Jr., Harleysville, Pa.

[73] Assignee: Air Products and Chemicals, Inc., Allentown, Pa.

[21] Appl. No.: 387,321

[22] Filed: Jul. 28, 1989

[51] Int. Cl.⁵ .............................................. F23L 1/00
[52] U.S. Cl. ...................................... 431/116; 431/9; 431/181; 431/10
[58] Field of Search .............. 431/9, 10, 115, 116, 431/11, 207, 181, 187, 166, 167, 243

[56] References Cited

U.S. PATENT DOCUMENTS

| | | | |
|---|---|---|---|
| Re. 24,682 | 8/1959 | Johnson | 431/116 |
| 3,174,526 | 3/1965 | Van Linde | 431/116 |
| 3,413,069 | 11/1968 | Walsh | 431/116 X |
| 3,817,685 | 6/1974 | Joannes | 431/116 |
| 4,003,691 | 1/1977 | Wormser | 431/116 |
| 4,055,334 | 10/1977 | Stephens | 266/138 |
| 4,408,983 | 10/1983 | Masters et al. | 431/116 |
| 4,601,655 | 7/1986 | Riley et al. | 431/116 |
| 4,693,680 | 9/1987 | Snyder et al. | 431/10 |
| 4,708,638 | 11/1989 | Brazier et al. | 431/116 |

FOREIGN PATENT DOCUMENTS 0018233  2/1977  Japan ................................. 431/116

OTHER PUBLICATIONS

Johnson et al., "The Development of a Vaporizing Oil Burner", 9/3/52, pp. 1–10.

*Primary Examiner*—Carl D. Price
*Attorney, Agent, or Firm*—James C. Simmons; William F. Marsh

[57] ABSTRACT

A non-water cooled, nozzle-mixed oxy-fuel burner wherein high oxidant velocity and a venturi aspirate or recycle products of combustion through the burner block and mix them into the flowing oxidant stream to act as a diluent and provide mass to moderate flame temperature. The burner includes means in said oxidant stream to improve flame stability.

8 Claims, 3 Drawing Sheets

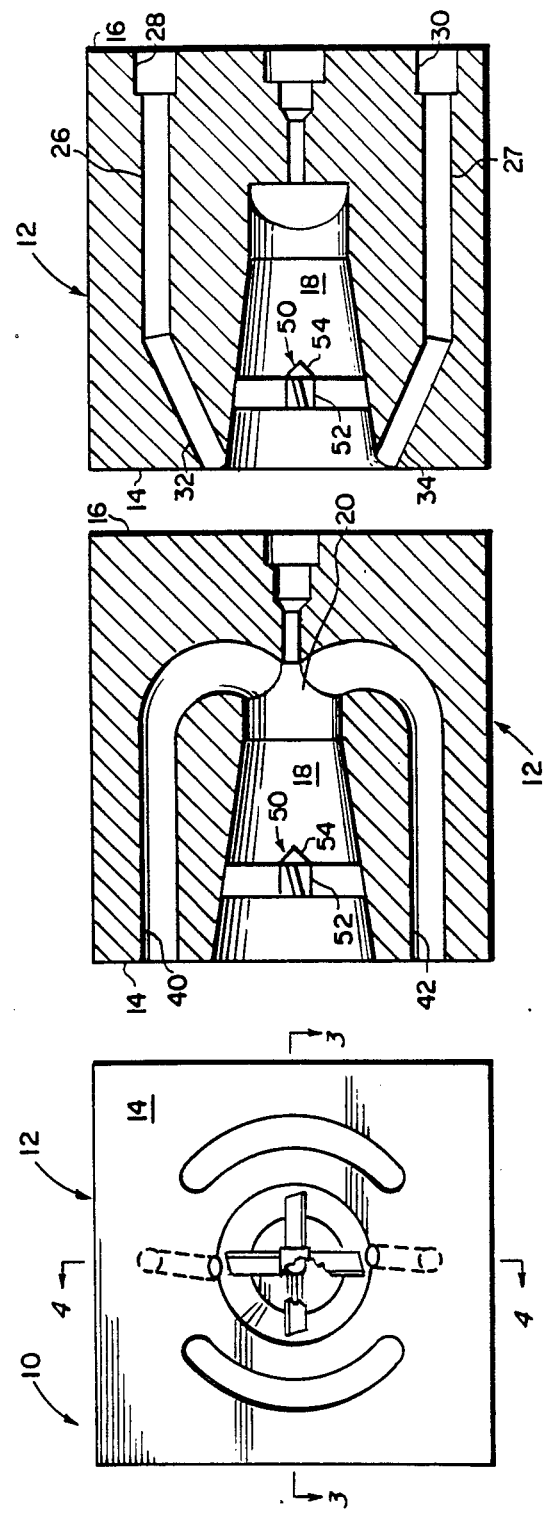

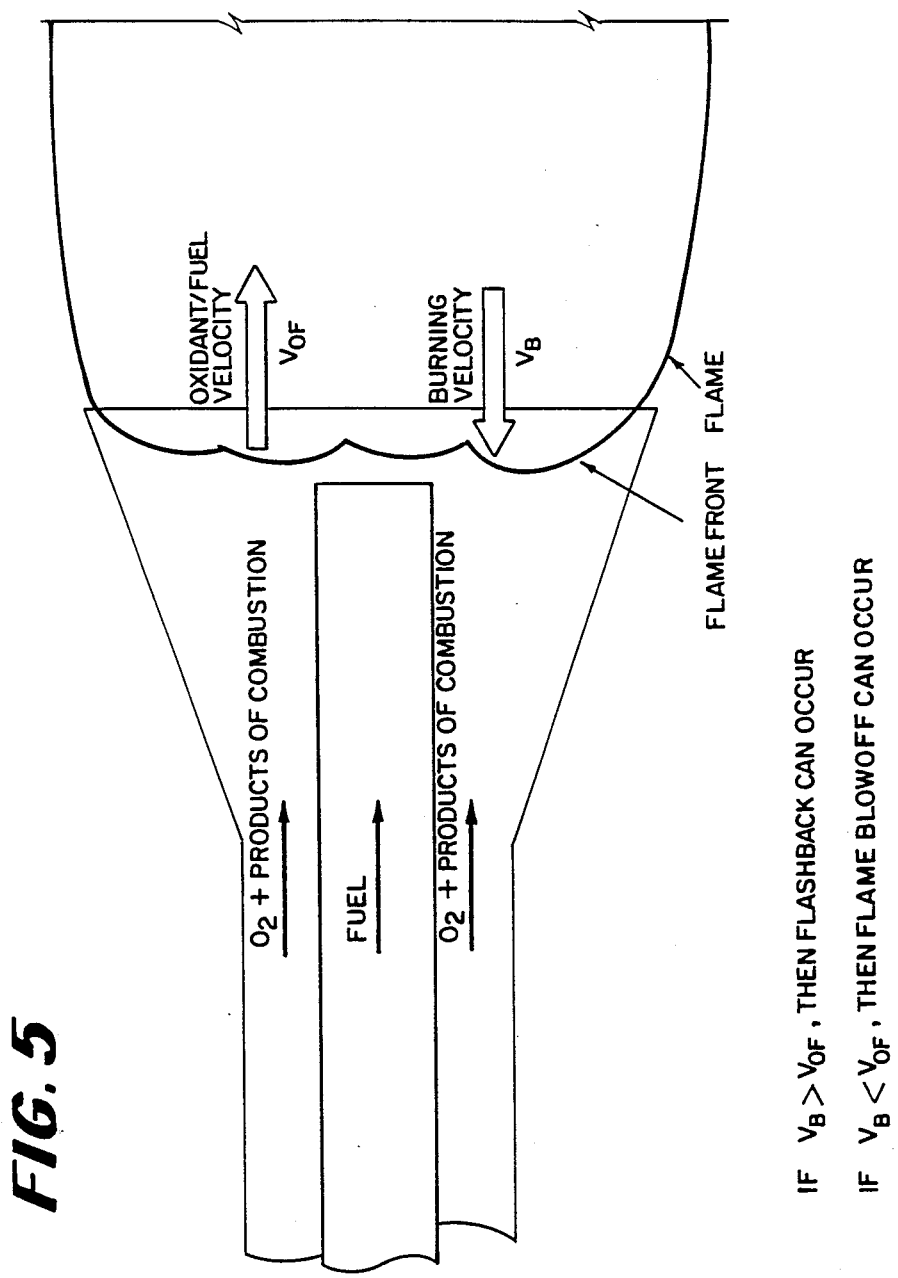

FLAME STABILIZED OXY-FUEL RECIRCULATING BURNER

FIELD OF THE INVENTION

The present invention pertains to oxy-fuel burners utilizing recycle of products of combustion for moderation of flame temperature.

BACKGROUND OF THE INVENTION

Recirculating or recycle burners and burner systems have been used for enhancing combustion, for preheating incoming air or oxygen and for moderating of the flame temperature. U.S. Pat. Nos. 4,003,691, 4,055,334 and 4,601,655 disclose and claim devices illustrating the prior art. A particularly effective burner utilizing the recycle of products of combustion is that which is shown in the '655 patent. However, the problem with the burner of the '655 patent is that the utilization of a high velocity oxidant stream to initiate through-block recirculation of the inert products of combustion tends to result in a burner with very little flame stability. Other types of oxy-fuel burners, such as that shown in U.S. Pat. No. 4,693,680 have attempted to stabilize the flame by utilizing stabilizing oxygen passages and the like, all without a great deal of success.

SUMMARY OF THE INVENTION

In order to stabilize the flame of a non-water cooled nozzle-mixed burner, which utilizes a high velocity oxidant. e.g. oxygen stream and a venturi, to aspirate or recycle products of combustion (e.g., $CO_2$, $H_2O$) through the burner and to mix them into the flowing oxidant stream to act as a diluent and to provide mass to moderate the flame, it was discovered that placement of a diffuser in the high velocity oxidant stream downstream of the point at which the inert products of combustion are recycled into the stream stabilizes the flame by reducing oxidant velocity and redistributing of the oxygen concentration uniformly across the oxidant passage. In addition to the diffuser, means to induce or impart swirl to the oxidant stream, which means can be combined with the diffuser, enhances the flame stability. The diffuser and swirl device can be made as an integral part of the burner if the burner is cast or can be added as a separate device.

BRIEF DESCRIPTION OF THE DRAWINGS

FIG. 2 is a front elevational view of the burner according to the present invention.

FIG. 3 is a section taken along line 3—3 of FIG. 2.

FIG. 4 is a section taken along line 4—4 of FIG. 2.

FIG. 5 is a schematic representation of the nozzle of a nozzle mix burner.

Figure 1:
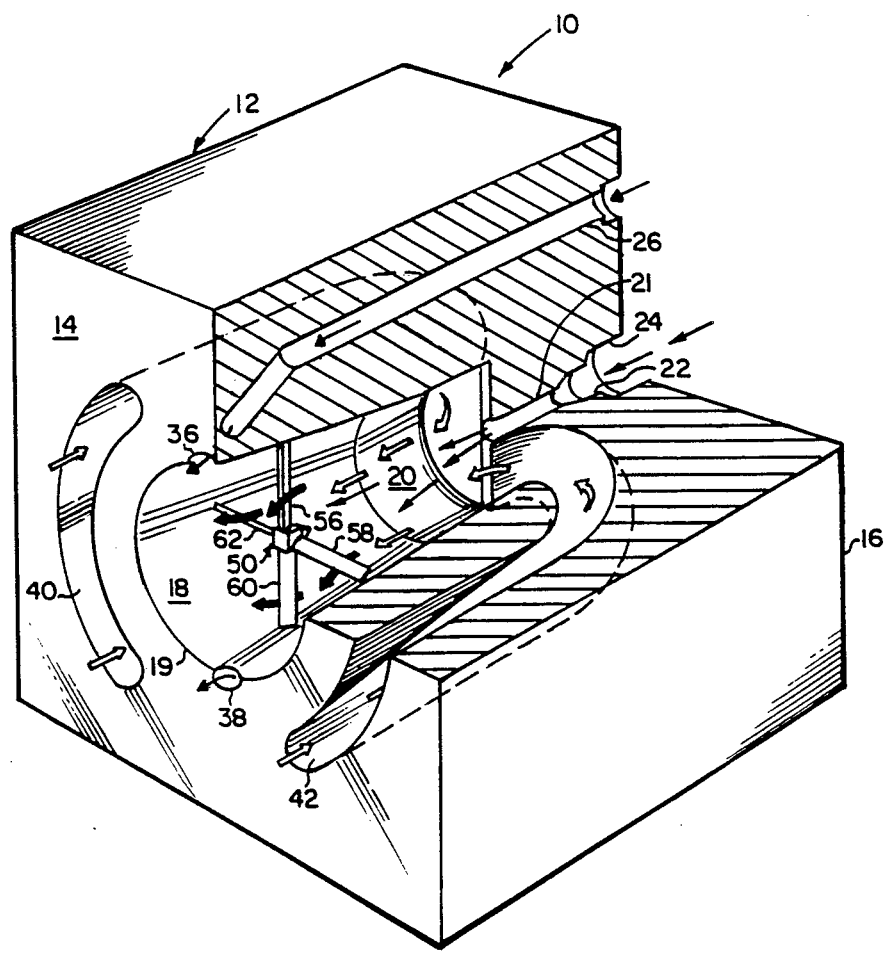
FIG. 1 is an isometric drawing with a portion removed of the burner of the present invention.

Recirculating oxy-fuel burners such as shown in U.S. Pat. No. 4,601,655 are excellent heating devices. The velocity of the oxidant (e.g., oxygen) required to induce recirculation of the products of combustion through the burner can be quite high (e.g., up to 1,000 feet per second). At these high oxidant flow velocities the flame tends to become highly unstable and will eventually extinguish at slightly positive furnace pressures. Since most industrial combustion furnaces operate at positive pressures to exclude cold air infiltration it became necessary to improve the flame stability of the recycle burner in order to have a commercially acceptable burner.

Several techniques and burner design modifications were attempted as a means to improve flame stability. Introduction of small amounts of fuel through ports located upstream of the main oxidant/fuel mixing region were thought to be capable of stabilization through the production of tiny flame sights which help anchor the main flame through the burner block. This was found to be an inadequate method of stabilizing the burner flame.

With the foregoing observations a burner according to the present invention as shown in the drawing was achieved. The burner, shown generally as 10, includes a burner block or housing 12 having a front or flame end 14 and a back or utility end 16. Making the burner in the form of a block 12 provides ease in fabrication, as one method of forming the burner can be by casting from a suitable ceramic or refractory material. Furthermore, the shape of the burner lends itself to ease of installation into a furnace or other apparatus to be heated through the normal wall and surrounded by other ceramics by ramming or by conventional brick and mortar techniques.

Extending inwardly from flame face 14 of burner housing 12 is an oxidant passage 1B having the shape of a truncated cone with the base of the cone opening on flame face 14. Oxidant passage 18 terminates toward the rear of block 12 in a generally cylindrical portion 20 which in turn is connected to an oxidant supply passage 21 which includes suitable ports or passages 22, 24 to connect oxidant supply passage 21 to a source of oxidant (e.g., oxygen) not shown. Adapters 22, 24 can include threaded sections or can have connectors cemented thereto.

At least one and preferably two fuel supply passages 26, 27 are disposed approximately 180° apart (FIG. 4) extending from suitable fittings 28, 30 on the utility or rear face 16 of burner block 12 and terminating in a outlet portion 32. 34 which outlet portion in turn terminates in an orifice 36, 38 (FIG. 1) on the flame face 14 of block 12 at the outward portion 19 of oxidant passage 18. A pair of diametrically opposed recirculation passages 40. 42 (FIGS. 1 and 3) extend from flame face 14 inwardly of burner block 12 terminating in the upper cylindrical portion 20 of oxidant passage 18. When high velocity oxidant, e.g. oxygen exits the oxidant supply passage 21 the velocity causes aspiration of products of combustion in the furnace or device being heated to be aspirated through passages 40, 42 and recirculated through oxidant passage 18 to moderate the flame temperature.

In testing a burner according to the invention oxygen velocities up to a 1,000 feet per second were required to induce recirculation of the products of combustion through the block. By test it was found that at high oxidant velocities, flame instability and eventual flame extinguishment at slightly positive furnace pressures took place. This was explained by comparing oxidant/fuel velocities with flame burning velocities. As shown in FIG. 5 the oxidant/fuel velocity must be balanced by the flame burning velocity in order to have a stable flame in nozzle-mix burners. If the oxidant/fuel velocity is too low, flash back or premature ignition will occur. If the oxidant/fuel velocity is too high, flame instability or "blow-off" will occur. It was found through the course of burner testing that when natural gas was used as the fuel (introduced through passages 26, 27) and was varied over a 10:1 firing rate turndown there was little impact on the overall flame stability. Thus it was concluded that the oxidant velocity determines the flame stability characteristics. In view of the fact that most industrial combustion furnaces operate at positive pressures to exclude cold air infiltration it was imperative that the flame stability of the recycle oxy-fuel burner be improved.

Referring to the drawing and in particular to FIG. 1, in order to solve the problem of flame instability, a diffuser shown generally as 50 was disposed in the oxidant passage 18 downstream of the point at which the recycle products of combustion entered the oxidant supply passage 18 as shown in the drawing. Diffuser 50 can comprise a base or block section 52 and a pyramid shaped section 54 with the pyramid shaped section 54 facing into the direction of flow of the oxidant and the recycle product stream. Diffuser 50 serves to provide oxidant velocity reduction and redistribution of the oxygen concentration uniformly throughout the total oxidant and recycle product stream. Diffuser 50 can be in any convenient shape and can be placed in the oxidant supply passage 18 in any convenient manner as by wires or the like. It was found that utilizing a plurality of supports in 56, 58, 60 and 62 in the shape of airfoils to support the diffuser 50 resulted in a swirl being imparted to the oxidant/recycle product stream which thus enhanced the stability of the flame. The diffuser location allows for high oxidant velocities to be maintained in the venturi region so that the burner recycle rates and performance were not compromised. The diffuser can be made integral to the cast burner block if the burner block is made from a ceramic or as a post-casting ceramic or metallic add on.

The diffuser supports (56, 58, 60, 62) or fins impart a swirling motion to the oxidant flow thus improving the mixing of oxygen and recirculated gases thus adding in the minimization of oxygen concentration gradients while improving downstream mixing of the oxidant and the fuel.

Set forth in Table 1 below is a comparison of oxygen concentration in the burner of the present invention with and without the diffuser 50 taken in the main oxidant flow stream (oxidant passage 18) during actual burner firings.

TABLE 1

| Oxygen Concentration in Burner Nozzle | | |
|---|---|---|
| | Without Diffuser | With Diffuser |
| O$_2$ Flow rate (SCFH) | 3200 | 4000 |
| Highest O$_2$ (%) | 49.2 | 33.8 |
| Lowest O$_2$ (%) | 13.1 | 11.2 |
| Maximum Gradient (%) | 36.1 | 22.6 |
| Average O$_2$ (%) | 22.7 | 22.9 |

The data in Table 1 shows that the maximum oxygen concentration gradient was reduced over 37% by the diffuser 50. This results in much mOre uniform Concentration of oxygen in the oxidant stream and a more even burning velocity distribution across the flame front which was projected to lead to improved flame stability. Measurement of velocity profiles during burner operation was not possible. However, two dimensional steady-state isothermal computer simulations of the burner with and without the diffuser were performed using a computational fluid dynamics software package that utilizes finite difference techniques to solve flow equations incorporating turbulence and gas phase mixing. Set forth in Table 2 below are the oxidant flow velocities predicted upstream (20) and downstream (18) of the diffuser (50) for two oxygen flowrates of 5,000 and 10,000 SCFH.

TABLE 2

| | Oxidant Flow Velocities (FT/S) | | | |
|---|---|---|---|---|
| | 10 MSCFH O$_2$ | | | |
| | Without Diffuser | | With Diffuser | |
| | Upstream | Downstream | Upstream | Downstream |
| Centerline | 700 | 542 | 696 | 68 |
| ⅓ Radius | 597 | 480 | 592 | 461 |
| ⅔ Radius | 601 | 404 | 599 | 426 |
| | 5 MSCFH O$_2$ | | | |
| Centerline | 577 | 410 | 580 | 65 |
| ⅓ Radius | 306 | 252 | 304 | 260 |
| ⅔ Radius | 296 | 186 | 295 | 197 |

The foregoing data of Table 2 show that centerline velocity was reduced by an average factor of seven using the diffuser. The velocities in the outer nozzle regions were not appreciably affected. However, the maximum velocity in the downstream region (18) was reduced by over 25%. Oxidant velocity reduction allows for improved flame stability according to the mechanism discussed previously (FIG. 5).

Set forth below in Table 3 are the results of nitrous oxide (NO$_x$) measurements in a 1000 cubic foot instrumented combustion chamber using the burner of invention and a conventional non-recirculatory oxy-fuel burner as the heat sources.

TABLE 3

| NO$_x$ Measurements | |
|---|---|
| Burner | NO$_x$ (LB/HR) |
| Inventive | 0.18 |
| Conventional | 0.55 |

The chamber temperature was maintained at 2100° F. and a moderate amount of cold air infiltration was allowed to simulate actual furnace situations such as opening of a charging door. From Table 3 it is apparent that the burner according to the invention produces three times less NO$_x$ than conventional oxy/fuel burners under these conditions and thus can be considered for use in environmentally sensitive applications. This reduction in NO$_x$ emission rate is attributed to a lower flame temperature which results from the recirculation of products of combustion.

Set forth in Table 4 below are the results of an actual test using the burner of the invention against a commercial air-fuel burner used to preheat ladles in a steel mill.

TABLE 4

| Burner Performance Comparisons | | | |
|---|---|---|---|
| Burner | Average Time to Setpoint (min) | Average Natural Gas Consumption to Setpoint (SCF) | Average Cost ($)* |
| Inventive | 47.5 | 1900 | 16.9 |
| Commercial | 80.0 | 8250 | 25.6 |
| Difference | 40% | 77% | 8.7 |

*Includes oxygen and assumes $3.10/1000 SCF NG.

From Table 4 it is apparent that the burner according to the invention took less time to reach the desired temperature, consumed less natural gas and resulted in an overall cost savings. In compiling the data of Table 4, the natural gas consumption for the burner of the invention included oxygen at a standard cost to a user and assumed a cost of $3.10 per 1000 standard cubic feet for natural gas. Overall the burner according to the invention exhibited a 64% fuel saving over the burner that was currently in use in the steel mill for ladle preheating. The burner operating in a steel mill environment was found to exhibit a more stable flame with no tendency to extinguish during use.

Set forth in Table 5 are published data on burning (flame) velocity for various fuels and air (21% oxygen); and 100% oxygen.

TABLE 5

Flame Velocities for Various Fuels

| Fuel | Maximum Flame Velocity (fps) | |
|---|---|---|
| | in air | in $O_2$ |
| Acetylene, $C_2H_2$ | 8.75 | — |
| Butane, commercial | 2.85 | — |
| Butane, n-$C_4H_{10}$ | 1.30 | — |
| Carbon Monoxide, CO | 1.70 | — |
| Carbureted water gas | 2.15 | — |
| Coke oven gas | 2.30 | — |
| Ethane, $C_2H_6$ | 1.56 | — |
| Hydrogen, $H_2$ | 9.30 | — |
| Mapp gas, $C_3H_4$ | — | 15.40 |
| Methane, $CH_4$ | 1.48 | 14.76 |
| Methanol, $CH_3OH$ | — | 1.60 |
| Natural gas | 1.00 | 15.20 |
| Producer gas | 0.85 | — |
| Propane, $C_3H_8$ | 1.52 | 12.20 |
| Propane, commercial | 2.78 | — |

Thus, several air-fuel non-recirculating burner designs constructed to substitute a portion of the energy requirement with a fuel having a different flame velocity were examined. For example, the burning velocity in air of hydrogen is approximately six times that of natural gas; substitution of hydrogen for some of the natural gas requirement would greatly increase the burning velocity and decrease the tendency of blow-off. Also, burning velocities for a given fuel increase with increasing oxygen concentration in the oxidant stream. Thus, oxygen enrichment is another practical means of minimizing blow-off. In the design of the invention the 100% incoming oxygen stream is diluted down to approximately 25% oxygen by means of the recycled products of combustion which tends to decrease the burning velocity, thereby destabilizing the flame. This is one of the major reasons why recycle burner flames are difficult to stabilize and why the diffuser of the present invention permits one to take advantage of the benefits of recycle combustion with a stabilized flame.

A well mixed oxidant/fuel mixture will burn much faster than one which is poorly mixed. Thus, baffles and/or swirl imparters can be used successfully to improve mixing of the oxidant and fuel which also increases the burning velocity. Although other methods do exist most of them lead to flame instability. Thus, with the diffuser of the present invention in the recycle burner the flame was stabilized and a burner and a method heretofore unknown were achieved.

Having thus described our invention what is desired to be secured by letters patent of the United States as set forth in the appended claims.

We claim:

1. A nozzle-mixed oxy-fuel burner comprising in combination:
   a solid body having a first or flame face and a second or utility face disposed generally parallel to and spaced apart from said flame face;
   an oxidant passage in said body extending inwardly from said flame face toward said utility face and communicating with means extending from said utility face toward said flame face to introduce oxidant into said oxidant passage;
   at least one fuel passage entering said body on said utility face and communicating with said oxidant passage at said flame face said fuel passage including means to introduce fuel into said fuel passage;
   means disposed in said oxidant passage to reduce oxidant velocity, cause redistribution of oxidant and promote uniform concentration of oxidant across said oxidant passage while simultaneously imparting a swirling motion to said oxidant stream; and
   at least one recirculatory passage to, when said burner is in use, withdraw products of combustion through said burner flame face and recirculate said products of combustion through said oxidant passage toward said flame face.

2. A burner according to claim 1 wherein said oxidant passage tapers inwardly from said flame face of aid burner toward said means for introducing oxidant thereinto.

3. A burner according to claim 1 wherein said fuel passage has a longitudinal axis at its discharge which intersects said oxidant passage at an acute angle.

4. A burner according to claim 1 wherein there are at least two fuel passages disposed 180° apart.

5. A burner according to claim 1 wherein said means in said oxidant passage has a cruciform shape.

6. A burner according to claim 5 wherein each arm of said cruciform shape is disposed at an angle to the longitudinal axis for said oxidant passage.

7. A burner according to claim 1 wherein said body is a one piece structure made from a cast refractory material.

8. A burner according to claim 1 wherein there are at least two recirculating passages disposed 180° apart.

* * * * *